UNITED STATES PATENT OFFICE.

HENRY L. DIXON, OF KNOXVILLE, PENNSYLVANIA, AND ALEXANDER L. SCHRAM, OF HILLSBORO, ILLINOIS.

GLASS-GATHERING FURNACE.

1,035,865.  Specification of Letters Patent.  Patented Aug. 20, 1912.

Application filed December 15, 1911. Serial No. 665,996.

*To all whom it may concern:*

Be it known that we, HENRY L. DIXON, a resident of Knoxville, in the county of Allegheny and State of Pennsylvania, and ALEXANDER L. SCHRAM, a resident of Hillsboro, in the county of Montgomery and State of Illinois, have invented a new and useful Improvement in Glass-Gathering Furnaces, of which the following is a full, clear, and exact description, reference being had to the accompanying drawings, forming part of this specification, in which—

Figure 1:
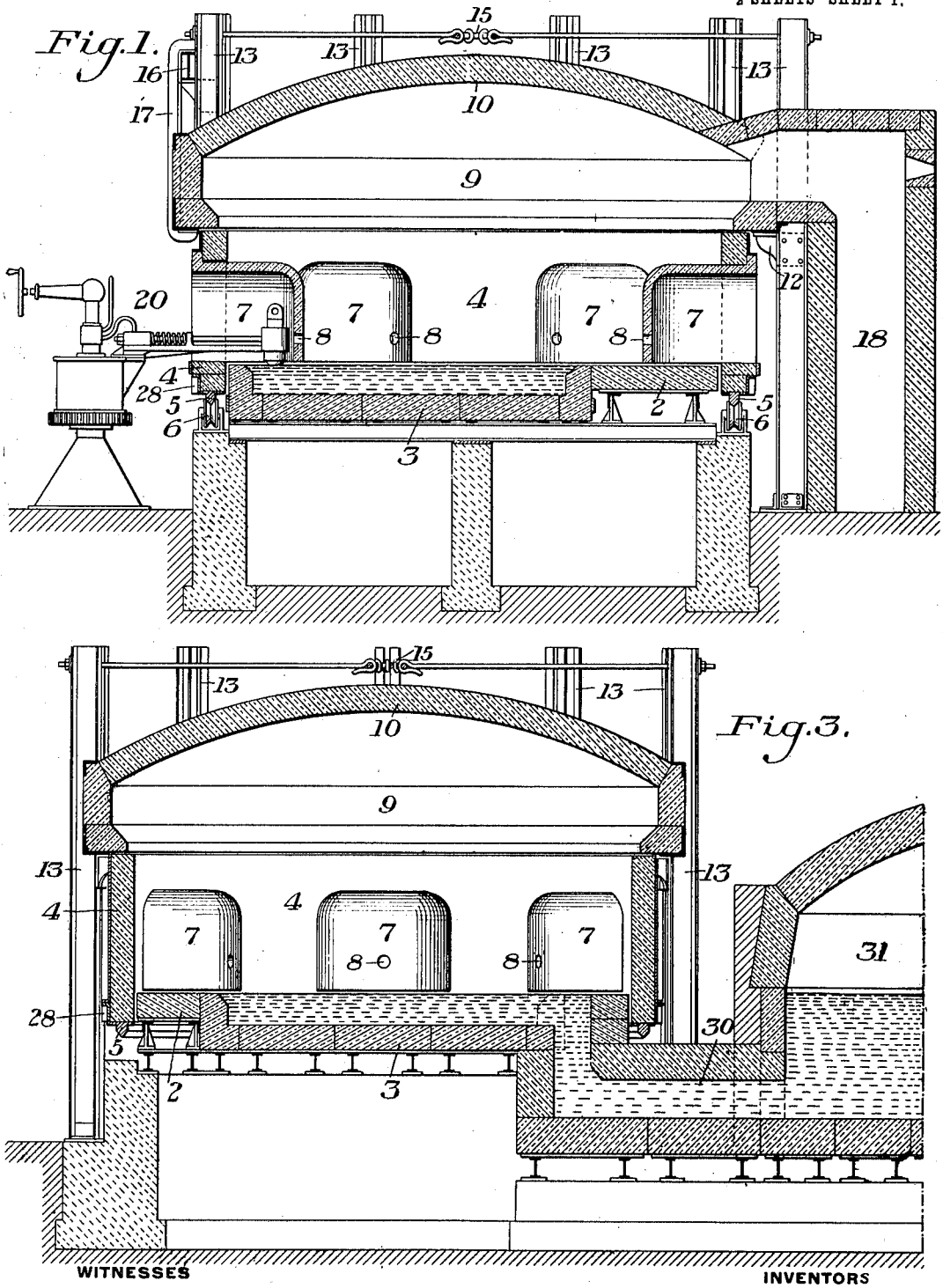
Figure 2:
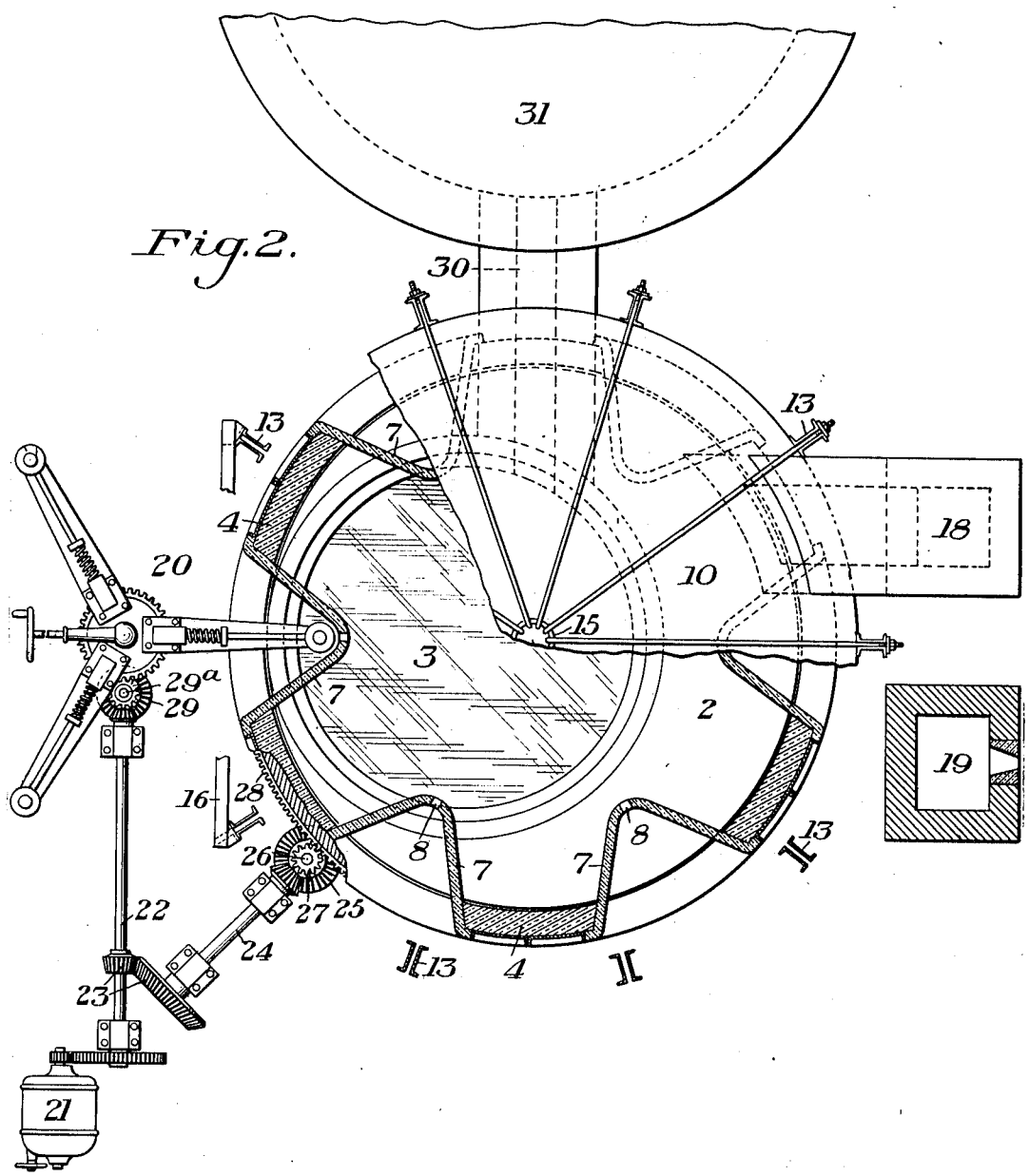

Figure 1 is a central vertical section showing a gathering furnace constructed in accordance with our invention. Fig. 2 is a sectional plan view of the same, and Fig. 3 is a section showing the manner of feeding glass to the furnace.

Our invention relates to the gathering of glass from a furnace and is designed to provide an improved furnace for this purpose which will be simple, cheap and easily operated.

In carrying out our invention we preferably provide a stationary glass receptacle or tank which is surrounded by a revolving body through which the heat supply circulates. This revolving body or turret has a furnace body proper provided with suitable recesses which open over the glass tank to allow access of the gathering tool. In the preferred form of our invention, the gathering hoods are formed as part of the revolving furnace body and the tank is eccentrically located relative to the center of revolution; the body being surmounted by a stationary dome shaped roof portion to which the inlet and outlet ports for the source of heat extend. The furnace may be varied, however, quite widely within the scope of our broader claims.

In the drawing 2 represents the refractory floor portion of a gathering furnace having the stationary glass holding tank or receptacle 3 located eccentrically therein. This tank is shown as of circular form, but it may be of any desirable shape. The body of the furnace 4 of annular form is mounted on a circular rail 5 resting on wheels 6 carried in suitable bearings on the foundation. This body is shown as provided with the inwardly projecting gathering hoods 7, which are spaced at suitable intervals apart, and are so arranged that as one of them passes over the drawing point it will expose the glass in the stationary tank. We have shown the gathering hoods as provided with holes 8 to allow a portion of the heat to escape into and over that portion of the glass bath exposed by the hood through a part of a revolution.

The upper portion 9 of the furnace, including the roof 10, is supported independently of the revolving body portion and may be carried on brackets 12 projecting inwardly from a circular row of supporting beams or columns 13. We have shown these vertical columns as being interconnected by adjustable stay rods extending to and connecting with a ring 15 arranged centrally over the furnace top. At the gathering side of the furnace we omit one of the columns and hang this portion of the stationary roof from a cross beam 16 having hangers 17.

The furnace may be, and preferably is, heated by regenerative action, 18 being the entrance flue for the heat products and 19 being the exit flue. Both of these flues are shown as leading into the upper stationary portion of the furnace, as this avoids complication and makes an efficient structure. The furnace may, however, be heated in any other desirable way.

The furnace is preferably used in connection with a gathering machine of any desirable type. We have shown such a machine diagrammatically at 20, it having three arms, each provided with a gathering device which may be of the suction type. In order to rotate the furnace and gathering machines, respectively, at such speeds that the suction arms will register with the gathering hoods, we preferably rotate the furnace body and gathering machines at fixed proportionate speeds.

In the form shown, 21 is an electric motor having slow motion connection with a shaft 22. This shaft 22 has a beveled gear connection 23 with a shaft 24, which shaft has a beveled gear connection 25 with the shaft 26 carrying a pinion 27 intermeshing with a circular rack 28 secured to the lower portion of the rotating furnace body. The shaft 22 also has beveled gear connection 29 with a shaft 29$^a$ having gear connection with a rotating shaft carrying the gathering tools. The gears are so proportioned that in the rotation of the furnace the gathering arms will swing into position in the hood at the gathering point as the hood moves past this gathering point. The parts may be rotated continuously at slow speed or may be turned intermittently, but we prefer to rotate the same continuously so that the gathering hood and gathering tool are moving relative to the glass during the gathering operation. This will tend to set up a slow circulation of glass within the tank. The tank may have any suitable connection with a tank furnace to feed glass to the gathering tank, such a connection being shown at 30 wherein 31 is the tank furnace. The connection here is shown as of inverted siphon form passing up underneath the support for the rotating body and thence into the bottom of the gathering tank.

The advantages of our invention result from the movement of the heat inclosing furnace body over the relatively stationary glass tank so that at certain intervals the glass is exposed at the gathering point.

We claim:

1. A glass gathering tank, a furnace over the tank, and means for rotating at least a portion of said furnace over the tank whereby a portion of the glass in the tank is successively exposed.

2. A glass gathering tank, a furnace cover over the tank and arranged eccentric thereto, and means for rotating at least a part of the furnace cover whereby portions of the glass in the tank are successively exposed.

3. A relatively stationary glass gathering tank, a furnace cover thereover, said furnace cover having a rotary zone or section provided with inward projections arranged to expose the glass in the tank, and means for rotating the turning portion of the furnace cover.

4. A stationary tank, a rotary furnace cover thereover having recesses, and a gathering machine having arms to enter said recesses during the movement of the furnace cover.

5. A stationary gathering tank, a furnace thereover having an upper stationary portion and an intermediate rotary portion, inlet and outlet flues for the upper stationary portion, and a source of glass supply leading to the gathering tank.

6. A gathering tank, an eccentric furnace thereover having a rotary intermediate portion provided with recesses to successively uncover the glass and supply and exhaust flues for heat leading into the upper stationary portion of the furnace.

7. A gathering tank furnace having a rotary portion with recesses to uncover the glass successively in combination with the gathering machine having tools arranged to enter the successive recesses.

8. A stationary tank eccentrically disposed in the bottom of a furnace, mechanism for turning at least a portion of the furnace over the tank, a source of glass supply entering the tank, and a gathering machine arranged to coöperate with the turning portion of the furnace.

In testimony whereof, we have hereunto set our hands.

HENRY L. DIXON.
ALEXANDER L. SCHRAM.

Witnesses:
GEO. B. BLEMING,
H. M. CORWIN.